United States Patent
Tabata

(10) Patent No.: US 8,632,870 B2
(45) Date of Patent: Jan. 21, 2014

(54) RECORDING LAYER FOR OPTICAL INFORMATION RECORDING MEDIUM AND OPTICAL INFORMATION RECORDING MEDIUM

(71) Applicant: Sony Corporation, Tokyo (JP)

(72) Inventor: Hiroshi Tabata, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/648,800

(22) Filed: Oct. 10, 2012

(65) Prior Publication Data

US 2013/0095348 A1    Apr. 18, 2013

(30) Foreign Application Priority Data

Oct. 17, 2011  (JP) .................. 2011-228278

(51) Int. Cl.
  *G11B 7/24*  (2013.01)
(52) U.S. Cl.
  USPC .................... 428/64.1; 428/64.4; 430/270.12

(58) Field of Classification Search
  USPC ..................... 428/64.4; 430/270.12
  See application file for complete search history.

(56) References Cited

U.S. PATENT DOCUMENTS 4,548,889 A * 10/1985 Nemoto et al. .......... 430/270.11

FOREIGN PATENT DOCUMENTS

JP    59177540     * 10/1984
JP    2011-042070 A   3/2011

* cited by examiner

*Primary Examiner* — Elizabeth Mulvaney
(74) *Attorney, Agent, or Firm* — Wolf, Greenfield & Sacks, P.C.

(57) ABSTRACT

An optical information recording medium includes a recording layer capable of recording information signals on the basis of application of light, wherein the recording layer contains an oxide of metal X and an oxide of metal Y, the metal X is at least one type selected from the group consisting of tungsten and molybdenum, and the metal Y is at least one type selected from the group consisting of copper, manganese, nickel, and silver.

18 Claims, 8 Drawing Sheets

RECORDING LAYER FOR OPTICAL INFORMATION RECORDING MEDIUM AND OPTICAL INFORMATION RECORDING MEDIUM

BACKGROUND

The present disclosure relates to a recording layer for an optical information recording medium and an optical information recording medium. In particular, the present disclosure relates to a recording layer for an optical information recording medium containing a metal oxide and an optical information recording medium including the same.

Up to this time, a compact disc (CD), a digital versatile disc (DVD), and the like have served as engines of the market of optical information recording media. However, in recent years, along with development of higher definition televisions and a sharp increase in data managed by a personal computer (PC), still larger capacity optical information recording media have been desired. In order to respond to this demand, a large capacity optical information recording medium, e.g., Blu-ray Disc (registered trademark, BD), compatible with blue laser have come along, and a new market of large capacity optical information recording media is about to take off.

Recordable optical information recording media include rewritable optical information recording media typified by a compact disc-rewritable (CD-RW) and a digital-versatile disc±rewritable (DVD±RW) and write-once optical information recording media typified by a compact disc-recordable (CD-R) and a digital versatile disc-reversible (DVD-R). In particular, the latter serving as low-price media have contributed significantly to expansion of the market. Therefore, it is believed that in order to expand the market of the large capacity optical information recording media compatible with blue laser as well, reduction in price of the write-once optical information recording media is desired. In addition, it is generally said that the optical information recording medium exhibits high storage reliability because of the recording and reproduction principle as compared with a hard disc drive (HDD), a flash memory, and the like. Demands for the optical information recording media as archival media have increased in recent years and, for example, usage in storage of important information has been started.

Recoding materials used for the write-once optical information recording media include inorganic materials and organic colorant materials. The organic colorant materials have been mainly studied as the recording materials of the write-once optical information recording media in the related art. However, inorganic materials have also been studied widely as the recording materials of the large capacity optical information recording media in recent years.

As for the inorganic material studied widely, a material containing palladium oxide as one of primary components is mentioned. For example, Japanese Unexamined Patent Application Publication No. 2011-42070 proposes an inorganic recording layer containing zinc (Zn) or aluminum (Al), palladium (Pd), and oxygen (O) as primary components.

SUMMARY

Palladium is a noble metal and the output thereof is very small. Therefore, if a recording material contains palladium oxide as one of primary components, it is difficult to reduce the price of an optical information recording medium. Consequently, realization of a recording layer is desired, the recording layer having sufficiently good recording characteristics even when the content of palladium is reduced or palladium is not contained.

Accordingly, it is desirable to provide a recording layer for an optical information recording medium having sufficiently good recording characteristics even when the content of palladium is reduced or palladium is not contained and an optical information recording medium including the same.

The engineers of the present disclosure performed studies to solve the above-described problems included in the related art. As a result, a combination of a metal X and a metal Y was found, where sufficiently good recording characteristics were obtained even when the content of palladium was reduced or palladium was not contained.

An optical information recording medium according to an embodiment of the present disclosure includes a recording layer capable of recording information signals on the basis of application of light, wherein the recording layer contains an oxide of metal X and an oxide of metal Y, the metal X is at least one type selected from the group consisting of tungsten and molybdenum, and the metal Y is at least one type selected from the group consisting of copper, manganese, nickel, and silver.

An optical information recording medium according to an embodiment of the present disclosure includes a plurality of recording layers capable of recording information signals on the basis of application of light, wherein at least one layer of the plurality of recording layers contains an oxide of metal X and an oxide of metal Y, the metal X is at least one type selected from the group consisting of tungsten and molybdenum, and the metal Y is at least one type selected from the group consisting of copper, manganese, nickel, and silver.

A recording layer for an optical information recording medium, according to an embodiment of the present disclosure, contains an oxide of metal X and an oxide of metal Y, wherein the metal X includes at least one type selected from the group consisting of tungsten and molybdenum, and the metal Y includes at least one type selected from the group consisting of copper, manganese, nickel, and silver.

In embodiments of the present disclosure, preferably, at least one information signal layer is disposed on a substrate and a cover layer is disposed on the information signal layer. The thickness of the cover layer is not specifically limited. The cover layers include a substrate, a sheet, a coating layer, and the like. A high NA objective lens is used and, therefore, preferably a high density optical information recording medium has a configuration in which a thin light-transmitting layer, e.g., a sheet or a coating layer, is adopted as the cover layer, and recording and reproduction of the information signals are performed by applying light from the light-transmitting layer side. In this case, an opaque substrate may be adopted. The incident surface of the light to record or reproduce the information signal is appropriately specified to be at least one of the surface on the cover layer side and the surface on the substrate side in accordance with the format of the optical information recording medium.

In embodiments of the present disclosure, the recording layer contains an oxide of metal X and an oxide of metal Y, the metal X is at least one type selected from the group consisting of tungsten and molybdenum, and the metal Y is at least one type selected from the group consisting of copper, manganese, nickel, and silver. Consequently, sufficiently good recording characteristics are obtained even when the content of palladium is reduced or palladium is not contained.

As described above, according to embodiments of the present disclosure, a recording layer for an optical information recording medium is realized, wherein sufficiently good recording characteristics are exhibited even when the content of palladium is reduced or palladium is not contained. In the case where an optical information recording medium includes such a recording layer, a reduction in the price of the medium is realized.

DETAILED DESCRIPTION OF EMBODIMENTS

The embodiments according to the present disclosure will be described in the following order.

1. First embodiment (example of optical information recording medium provided with a single information signal layer)

2. Second embodiment (example of optical information recording medium provided with a plurality of information signal layers)

1. First Embodiment

Configuration of Optical Information Recording Medium

Figure 1:
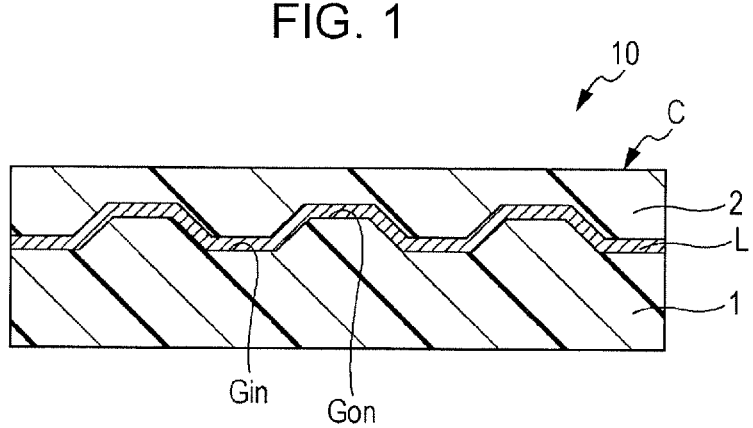
FIG. 1 is a schematic sectional view showing a configuration example of an optical information recording medium according to a first embodiment of the present disclosure.

FIG. 1 is a schematic sectional view showing a configuration example of an optical information recording medium according to a first embodiment of the present disclosure. This optical information recording medium 10 is a so-called single-layer write-once optical information recording medium and has a configuration in which an information signal layer L and a light-transmitting layer 2 serving as a cover layer are stacked on one principal surface of a substrate 1, as shown in FIG. 1.

In the optical information recording medium 10 according to the first embodiment, laser light is applied to the information signal layer L from a surface C on the light-transmitting layer 2 side and, thereby, information signals are recorded or reproduced. For example, the laser light with a wavelength within the range of 400 nm or more and 410 nm or less is condensed by an objective lens having a numerical aperture within the range of 0.84 or more and 0.86 or less and is applied to the information signal layer L from the light-transmitting layer 2 side, so as to record or reproduce the information signals. Examples of such an optical information recording medium 10 include a single-layer BD-R. Hereafter the surface C irradiated with the laser light to record the information signals on the information signal layer L or reproduce is referred to as a light-irradiation surface C.

The substrate 1, the information signal layer L, and the light-transmitting layer 2 constituting the optical information recording medium 10 will be described below sequentially.

Substrate

The substrate 1 has, for example, an annular shape, in which an opening (hereafter referred to as a center hole) is disposed at the center. One principal surface of the substrate 1 is, for example, an uneven surface, and an information signal layer L0 is formed on the uneven surface. Hereafter a concave portion in the uneven surface is referred to as an in-groove Gin and a convex portion is referred to as an on-groove Gon.

Examples of shapes of the in-groove Gin and the on-groove Gon include various shapes, e.g., a spiral shape and a concentric shape. The in-groove Gin and/or the on-groove Gon are allowed to wobble (meander) for the purpose of stabilization of the linear velocity, addition of address information, and the like.

The diameter of the substrate 1 is specified to be, for example, 120 mm. The thickness of the substrate 1 is selected in consideration of the rigidity and is specified to be preferably 0.3 mm or more and 1.3 mm or less, and more preferably 0.6 mm or more and 1.3 mm or less. The thickness is specified to be, for example, 1.1 mm. The diameter of the center hole is specified to be, for example, 15 mm.

For example, a plastic material or glass may be used as the material for the substrate 1, and the plastic material is used preferably from the viewpoint of cost. Examples of plastic materials include polycarbonate based resins, polyolefin based resins, and acrylic resins.

Information Signal Layer

The information signal layer L includes at least an inorganic recording layer capable of recording information signals on the basis of application of laser light. From the viewpoint of an improvement in storage reliability, the information signal layer L preferably further includes a protective layer disposed adjoining at least one surface of the inorganic recording layer and, more preferably, further includes protective layers disposed adjoining both surfaces of the inorganic recording layer. First and second configuration examples will be described below as concrete examples of the information signal layer.

First Configuration Example

Figure 2A:
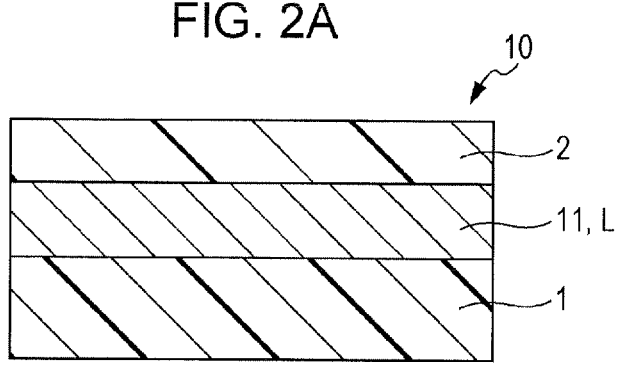
FIG. 2A is a schematic diagram showing a first configuration example of an information signal layer.

FIG. 2A is a schematic diagram showing the first configuration example of the information signal layer. As shown in FIG. 2A, the information signal layer L is made from an inorganic recording layer 11. The optical information recording medium 10 is allowed to become inexpensive and the productivity thereof is improved by employing such a simple configuration.

Inorganic Recording Layer

Preferably, the inorganic recording layer 11 contains an oxide of metal X and an oxide of metal Y as primary components. The metal X is preferably made from a material which is almost transparent when being converted to an oxide, where the oxide has an attenuation coefficient k of 0 or close to 0. Among the metals X having the above-described characteristics, at least one type selected from the group consisting of tungsten (W) and molybdenum (Mo) is used preferably. In the case where such a material is used and the thermal expansion of the oxide of the metal Y during recording is controlled not to become too large, a sufficiently wide recording power margin is ensured and changes in transmittance between before and after recording is suppressed.

The metal Y is preferably made from a material which has some extent of absorption coefficient when being converted to an oxide, where an absolute value of standard free energy of formation of the oxide is smaller than that of the metal X. In the case where such a material is used, the inorganic recording layer 11 absorbs the laser light to convert to heat, so that oxygen is released and expansion occurs. Consequently, the information signal can be recorded on the basis of application of the light. Among the metals Y having the above-described characteristics, at least one type selected from the group consisting of copper (Cu), manganese (Mn), nickel (Ni), and silver (Ag) is preferable. This is because the recording power of the laser light to record the information signals is reduced as compared with that in the case where a metal material other than the above-described metals is used as the metal Y. From the viewpoint of an improvement in power margin, the metal Y is preferably a metal containing at least Cu, and is more preferably Cu. Concretely, the metal containing at least Cu is a combination of Cu and at least one type of metal selected from the group consisting of Mn, Ni, and Ag. From the viewpoint of realization of the inorganic recording layer 11, in which the noble metal content is reduced, or the noble metal-free inorganic recording layer (noble metal-less recording layer) 11, the metal Y is preferably at least one type selected from the group consisting of Cu, Mn, and Ni.

The ratio (a/b) satisfies the relationship represented by preferably $0.1 \leq a/b \leq 2.7$, and more preferably $0.25 \leq a/b \leq 2.7$, where the atomic ratio of the metal X relative to a total of the metal X and the metal Y is specified to be a, and the atomic ratio of the metal Y relative to the total of the metal X and the metal Y is specified to be b. In the case where the ratio (a/b) is 0.1 or more, a good power margin can be obtained. In the case where the ratio (a/b) is 2.7 or less, the information signals can be recorded by a future consumer-oriented drive.

Alternatively, the ratio (a/b) satisfies the relationship represented by preferably $0.1 \leq a/b \leq 1.3$, and more preferably $0.25 \leq a/b \leq 1.3$, where the atomic ratio of the metal X relative to a total of the metal X and the metal Y is specified to be a, and the atomic ratio of the metal Y relative to the total of the metal X and the metal Y is specified to be b. In the case where the ratio (a/b) is 0.1 or more, a good power margin can be obtained. In the case where the ratio (a/b) is 1.3 or less, the information signals can be recorded by even a current consumer-oriented drive.

Preferably, the inorganic recording layer 11 further contains an oxide of zinc (Zn) as an oxide of metal Z, so as to contain an oxide of metal X, an oxide of metal Y, and an oxide of metal Z as primary components. This is because the content of the oxide of metal Y is thereby reduced and the optical information recording medium 10 is allowed to become inexpensive. In particular, in the case where the metal Y contains Ag, the inorganic recording layer 11 preferably contains an oxide of metal Z. This is because the content of Ag, which is a noble metal, is thereby reduced and the optical information recording medium 10 is allowed to become inexpensive. The atomic ratio c is preferably 50 atomic percent or less, where the atomic ratio of the metal Z relative to a total of the metal X, the metal Y, and the metal Z is specified to be c. In the case where the atomic ratio c is specified to be 50 atomic percent or less, degradation in storage reliability is suppressed.

The inorganic recording layer 11 may contain a very small amount of expensive noble metals, e.g., Pd and Pt, as secondary components. However, from the viewpoint of the optical information recording medium 10 becoming inexpensive, preferably, the inorganic recording layer 11 does not contain expensive noble metals, e.g., Pd and Pt. In this regard, it is enough that the optical information recording medium 10 according to the first embodiment contains an oxide of metal X and an oxide of metal Y as primary components, and addition of expensive noble metals, e.g., Pd and Pt, hardly exerts an influence on the recording characteristics of the optical information recording medium 10. Meanwhile, Ag is excluded from the expensive noble metals concerned.

Second Configuration Example

Figure 2B:
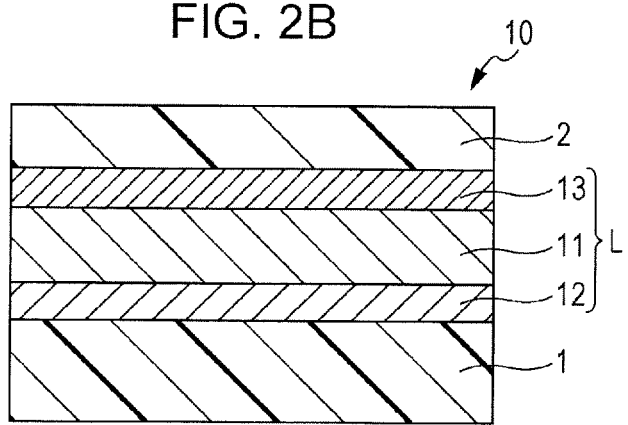
FIG. 2B is a schematic diagram showing a second configuration example of the information signal layer.

FIG. 2B is a schematic diagram showing the second configuration example of the information signal layer. As shown in FIG. 2B, an information signal layer L includes, for example, an inorganic recording layer 11 having an upper surface (second principal surface) and a lower surface (first principal surface), a first protective layer 12 disposed adjoining the lower surface of the inorganic recording layer 11, and a second protective layer 13 disposed adjoining the upper surface of the inorganic recording layer 11. The durability of the inorganic recording layer 11 is improved by employing such a configuration. Here, the upper surface refers to a principal surface on the side irradiated with the above-described laser light to record or reproduce information signals among the two principal surfaces of the inorganic recording layer 11, and the lower surface refers to a principal surface opposite to the side irradiated with the above-described laser light, that is, a principal surface on the substrate side.

Inorganic Recording Layer

The inorganic recording layer 11 may be the same as that in the above-described first configuration example.

Protective Layer

Preferably, a dielectric layer or a transparent electrically conductive layer is used as the first protective layer 12 and the second protective layer 13. The dielectric layer may be used as one of the first protective layer 12 and the second protective layer 13, and the transparent electrically conductive layer may be used as the other. The dielectric layer or the transparent electrically conductive layer functions as an oxygen barrier layer and, thereby, the durability of the inorganic recording layer 11 is improved. Furthermore, changes in film quality (mainly detected as a reduction in the reflectivity) of the recording film are reduced by suppressing escape of oxygen from the inorganic recording layer 11, so that the film quality suitable for the inorganic recording layer 11 is ensured.

Examples of materials for the first protective layer 12 and the second protective layer 13 include oxides, nitrides, sulfides, carbides, fluorides, and mixtures thereof. The material for the first protective layer 12 and the material for the second protective layer 13 may be the same or be different from each other. Examples of oxides include an oxide of at least one type of element selected from the group consisting of In, Zn, Sn, Al, Si, Ge, Ti, Ga, Ta, Nb, Hf, Zr, Cr, Si, and Mg. Examples of nitrides include a nitride of at least one type of element selected from the group consisting of In, Sn, Ge, Cr, Si, Al, Nb, Mo, Ti, W, Ta, and Zn, and preferably a nitride of at least one type of element selected from the group consisting of Si, Ge, and Ti. Examples of sulfides include a Zn sulfide. Examples of carbides include a carbide of at least one type of element selected from the group consisting of In, Sn, Ge, Cr, Si, Al, Ti, Zr, Ta, and W, and preferably a carbide of at least one type of element selected from the group consisting of Si, Ti, and W. Examples of fluorides include a fluoride of at least one type of element selected from the group consisting of Si, Al, Mg, Ca, and La. Examples of mixtures thereof include $ZnS$—$SiO_2$, $SiO_2$—$In_2O_3$—$ZrO_2$ (SIZ), $SiO_2$—$Cr_2O_3$—$ZrO_2$ (SCZ), $In_2O_3$—$SnO_2$ (ITO), $In_2O_3$—$CeO_2$ (ICO), $In_2O_2$—$Ga_2O_3$ (IGO), $In_2O_2$—$Ga_2O_3$—$ZnO$ (IGZO), $Sn_2O_2$—$Ta_2O_5$ (TTO), and $TiO_2$—$SiO_2$.

Light-Transmitting Layer

A light-transmitting layer 2 is, for example, a resin layer produced by curing a photosensitive resin, e.g., an ultraviolet-curable resin. Examples of materials for this resin layer include an ultraviolet-curable acrylic resin. The light-transmitting layer 2 may be formed from a light-transmitting sheet having an annular shape and an adhesive layer to bond this light-transmitting sheet to the substrate 1. Preferably, the light-transmitting sheet is made from a material having a low absorptive power with respect to the laser light used for recording and reproduction, and concretely a material having transmittance of 90 percent or more. Examples of materials used for the light-transmitting sheet include polycarbonate resin materials and polyolefin based materials (for example, ZEONEX (registered trademark)). Examples of materials used for the adhesive layer include ultraviolet-curable resins and pressure sensitive adhesives (PSA).

The thickness of the light-transmitting layer 2 is selected within the range of preferably 10 μm or more and 177 μm or less, and is specified to be, for example, 100 μm. High density recording is realized by combining such a thin light-transmitting layer 2 and an objective lens with an increased numerical aperture (NA) of about 0.85.

Method for Manufacturing Optical Information Recording Medium

An example of a method for manufacturing the optical information recording medium according to the first embodiment of the present disclosure will be described below.

Process to Subject Substrate to Forming

The substrate 1 provided with an uneven surface on one principal surface is subjected to forming. Examples of methods for forming the substrate 1 include an injection forming method and a photopolymer method (2P method: photo polymerization).

Process to Form Information Signal Layer

An information signal layer L is formed on the substrate 1 by, for example, a sputtering method. A concrete process to form the information signal layer L is different depending on the configuration. For example, in the case where the information signal layer L shown in the above-described first configuration example is employed, the information signal layer L is formed by forming the inorganic recording layer 11 on the substrate 1. In the case where the information signal layer L shown in the above-described second configuration example is employed, the information signal layer L is formed by stacking the first protective layer 12, the inorganic recording layer 11, and the second protective layer 13 sequentially on the substrate 1.

The processes to form the first protective layer 12, the inorganic recording layer 11, and the second protective layer 13 will be described below concretely.

Process to Form First Protective Layer

The substrate 1 is conveyed into a vacuum chamber provided with a target to form the first protective layer, and the inside of the vacuum chamber is evacuated until a predetermined pressure is reached. Thereafter, the target is sputtered while a process gas, e.g., an Ar gas or an $O_2$ gas, is introduced into the vacuum chamber, so as to form the first protective layer 12 on the substrate 1. For example, a high frequency (RF) sputtering method or a direct-current (DC) sputtering method may be used as the sputtering method, although the direct-current sputtering method is preferable. This is because the film formation rate of the direct-current sputtering method is higher than that of the high frequency sputtering method and, therefore, the productivity is improved.

Process To Form Inorganic Recording Layer

The substrate 1 is conveyed into a vacuum chamber provided with a target to form the inorganic recording layer, and the inside of the vacuum chamber is evacuated until a predetermined pressure is reached. Thereafter, the target is sputtered while a process gas, e.g., an Ar gas or an $O_2$ gas, is introduced into the vacuum chamber, so as to form the inorganic recording layer 11 on the first protective layer 12.

Target to Form Inorganic Recording Layer

A metal target containing the metal X and the metal Y as primary components or a metal oxide target containing an oxide of the metal X and an oxide of the metal Y as primary components may be used as the target to form the inorganic recording layer. Preferably, the metal target containing the metal X and the metal Y as primary components is used because a film is formed by the direct-current sputtering method. This is because the film formation rate of the direct-current sputtering method is higher than that of the high frequency sputtering method and, therefore, the productivity is improved. In these target, preferably, the ratio (a/b) of the atomic ratio a of the metal X to the atomic ratio b of the metal Y is specified to be the same as the ratio (a/b) of the above-described inorganic recording layer 11.

A metal target further containing zinc (Zn) as the metal Z or a metal oxide target further containing an oxide of zinc (Zn) as the oxide of the metal Z may be used as the target to form the inorganic recording layer. That is, a metal target containing the metal X, the metal Y, and the metal Z as primary components or a metal oxide target containing an oxide of the metal X, an oxide of the metal Y, and an oxide of the metal Z as primary components may be used as the target to form the inorganic recording layer. Among these targets, in consideration of the productivity, the metal target containing the metal X, the metal Y, and the metal Z as primary components is preferably used because a film is formed by the direct-current sputtering method.

Process to Form Second Protective Layer

The substrate 1 is conveyed into a vacuum chamber provided with a target to form the second protective layer, and the inside of the vacuum chamber is evacuated until a predetermined pressure is reached. Thereafter, the target is sputtered while a process gas, e.g., an Ar gas or an $O_2$ gas, is introduced into the vacuum chamber, so as to form the second protective layer 13 on the inorganic recording layer 11. For example, the high frequency (RF) sputtering method or the direct-current (DC) sputtering method may be used as the sputtering method, although the direct-current sputtering method is particularly preferable. This is because the film formation rate of the direct-current sputtering method is higher than that of the high frequency sputtering method and, therefore, the productivity is improved.

In this manner, the information signal layer L is formed on the substrate 1.

Process to Form Light-Transmitting Layer

The information signal layer L is spin-coated with a photosensitive resin, e.g., an ultraviolet-curable resin (UV resin), by a spin coating method, for example. Thereafter, the photosensitive resin is irradiated with light, e.g., ultraviolet rays, so as to be cured. In this manner, the light-transmitting layer 2 is formed on the information signal layer L.

A predetermined optical information recording medium is obtained by the above-described processes.

Advantages

According to the first embodiment, the inorganic recording layer 11 contains an oxide of the metal X and an oxide of the metal Y as primary components (where the metal X is at least one type selected from the group consisting of tungsten and molybdenum, and the metal Y is at least one type selected from the group consisting of copper, manganese, nickel, and silver). Therefore, even when the content of Pd is reduced and an oxide of Pd is a secondary component or palladium is not contained, nearly the same recording characteristics as those in the case where an oxide of Pd is contained as one of primary components are maintained. Consequently, the price of the medium is reduced while nearly the same recording characteristics as those in the case where an oxide of Pd is contained as one of primary components are maintained.

2. Second Embodiment

Configuration of Optical Information Recording Medium

Figure 3:
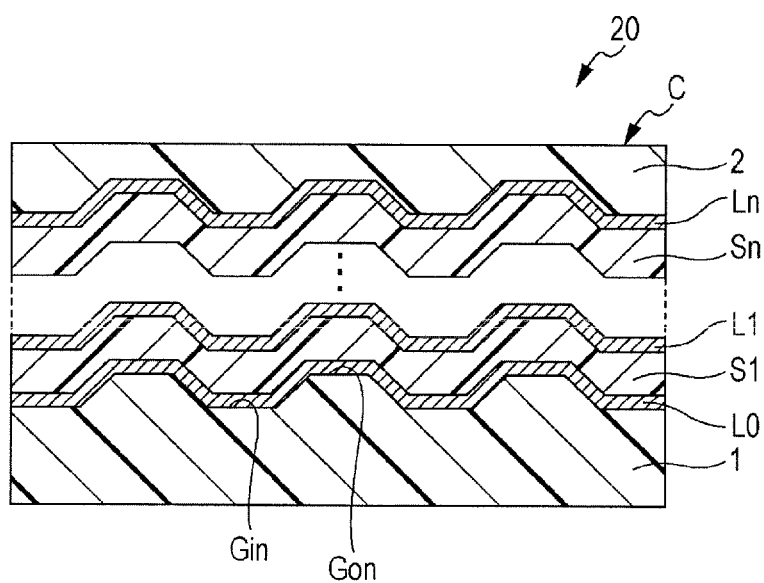
FIG. 3 is a schematic sectional view showing a configuration example of an optical information recording medium according to a second embodiment of the present disclosure.

FIG. 3 is a schematic sectional view showing a configuration example of an optical information recording medium according to a second embodiment of the present disclosure. In the second embodiment, the same places as those in the first embodiment are represented by the same reference numerals set forth above and further explanations thereof will not be provided. This optical information recording medium 20 is a so-called multilayer write-once optical information recording medium and has a configuration in which an information signal layer L0, an intermediate layer S1, an information signal layer L1, . . . , an intermediate layer Sn, an information signal layer Ln, and a light-transmitting layer 2 serving as a cover layer are stacked in that order on one principal surface of a substrate 1, as shown in FIG. 3.

In the optical information recording medium 20 according to the second embodiment, laser light is applied to each of the information signal layers L0 to Ln from a light-irradiation surface C on the light-transmitting layer 2 side and, thereby, information signals are recorded or reproduced. For example, the laser light with a wavelength within the range of 400 nm or more and 410 nm or less is condensed by an objective lens having a numerical aperture within the range of 0.84 or more and 0.86 or less and is applied to each of the information signal layers L0 to Ln from the light-transmitting layer 2 side, so as to record or reproduce the information signals. Examples of such an optical information recording medium 20 include a multilayer BD-R.

Information Signal Layer

Each of the information signal layers L0 to Ln includes at least an inorganic recording layer capable of recording information signals on the basis of application of laser light. From the viewpoint of an improvement in storage reliability, each of the information signal layers L0 to Ln preferably further includes a protective layer on at least one surface of the inorganic recording layer and, more preferably, further includes protective layers disposed on both surfaces of the inorganic recording layer. All layer configurations of the information signal layers L0 to Ln may be the same configuration, or the layer configuration may be changed individually in accordance with the characteristics (for example, optical characteristics and durability) suitable for each of the information signal layers L0 to Ln. However, from the viewpoint of the productivity, all layers have the same layer configuration preferably.

First and second configuration examples will be described below as concrete examples of the information signal layers L0 to Ln.

First Configuration Example

Figure 4A:
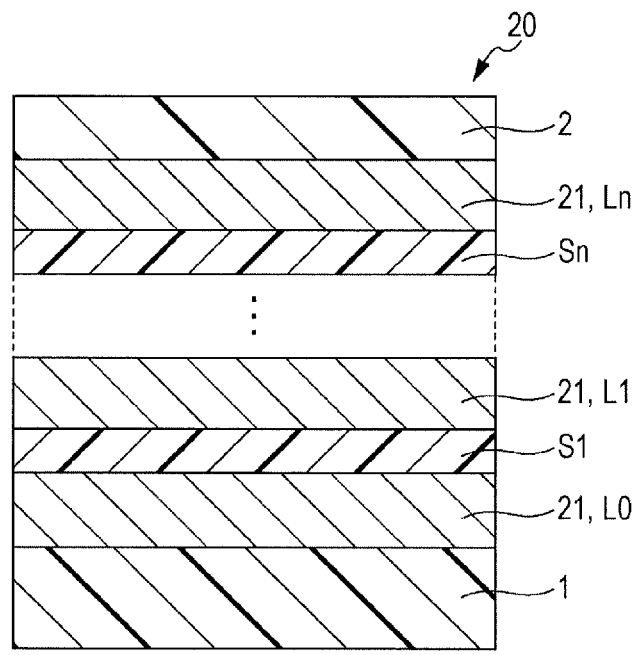
FIG. 4A is a schematic diagram showing a first configuration example of each information signal layer.

FIG. 4A is a schematic diagram showing the first configuration example of each information signal layer. As shown in FIG. 4A, each of the information signal layers L0 to Ln is made from an inorganic recording layer 21. The optical information recording medium 10 is allowed to become inexpensive and the productivity thereof is improved by employing such a simple configuration. Such an effect becomes remarkable as the number of layers of the information signal layers L0 to Ln of the medium increases.

Inorganic Recording Layer

The inorganic recording layer 21 may be the same as the inorganic recording layer 11 in the above-described first embodiment. Preferably, all the inorganic recording layers 21 included in the information signal layers L0 to Ln contain an oxide of metal X and an oxide of metal Y as primary components. Consequently, there is an advantage that the contents of Pd contained in the information signal layers L0 to Ln are reduced or the information signal layers L0 to Ln not containing Pd are provided. In addition, there is also an advantage that all the information signal layers L0 to Ln are formed by co-sputtering a target of the metal X and a target of the metal Y and, thereby, production facilities are simplified. Preferably, the ratio (a/b) of the inorganic recording layer 21 of each of the information signal layers L0 to Ln is adjusted in accordance with the recording characteristics and optical characteristics (for example, recording sensitivity and transmission characteristics) suitable for each of the information signal layers L0 to Ln. In this case, the transmittance tends to become high and the recording sensitivity tends to be lowered as the ratio (a/b) increases.

Second Configuration Example

Figure 4B:
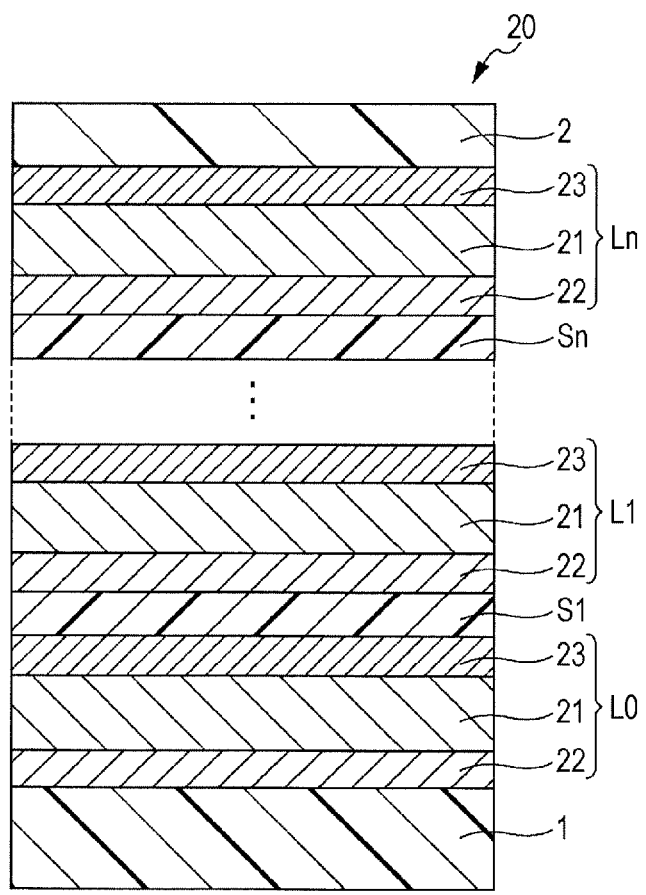
FIG. 4B is a schematic diagram showing a second configuration example of each information signal layer.

FIG. 4B is a schematic diagram showing the second configuration example of each of the information signal layers. As shown in FIG. 4B, each of information signal layers L0 to Ln includes, for example, an inorganic recording layer 21 having an upper surface (second principal surface) and a lower surface (first principal surface), a first protective layer 22 disposed adjoining the lower surface of the inorganic recording layer 21, and a second protective layer 23 disposed adjoining the upper surface of the inorganic recording layer 21. The durability of the inorganic recording layer 21 is improved by employing such a configuration.

Inorganic Recording Layer

The inorganic recording layer 21 may be the same as that in the above-described first configuration example.

Protective Layer

The first protective layer 22 and the second protective layer 23 may be the same as the first protective layer 12 and the second protective layer 13, respectively, in the above-described first embodiment. Preferably, the materials and the composition ratios of the first protective layer 22 and the second protective layer 23 are specified appropriately in accordance with the characteristics (for example, optical characteristics and durability) suitable for each of the information signal layers L0 to Ln.

Intermediate layer

Intermediate layers S1 to Sn play roles in separating the information signal layers L0 to Ln from each other at a physically optically sufficient distance and the surfaces thereof have uneven surfaces. The uneven surfaces have, for example, spiral or concentric shapes (in-groove Gin and on-groove Gon). The thickness of the intermediate layers S1 to Sn are specified to be preferably 9 μm to 50 μm. The material for the intermediate layers S1 to Sn is not specifically limited, although ultraviolet-curable acrylic resins are used preferably. The intermediate layers S1 to Sn serve as optical paths of laser light to record or reproduce information signals toward the layers in the deeper side and, therefore, it is preferable to have sufficiently high light-transmitting property.

Method for Manufacturing Optical Information Recording Medium

An example of a method for manufacturing the optical information recording medium 20 according to the second embodiment of the present disclosure will be described below.

The substrate is formed in the same manner as that in the first embodiment, and the information signal layer L0 is formed on the substrate 1. An ultraviolet-curable resin is applied to the information signal layer L0 uniformly by, for example, the spin coating method. An uneven pattern of a stamper is pressed against the ultraviolet-curable resin applied uniformly to the information signal layer L0, the ultraviolet-curable resin is irradiated with ultraviolet rays so as to be cured, and the stamper is peeled off. Consequently, the uneven pattern of the stamper is transferred to the ultraviolet-curable resin, so that, for example, the intermediate layer S1 having the in-groove Gin and the on-groove Gon is formed on the information signal layer L0.

In the same manner as that in the above-described process to form the information signal layer L0 and the intermediate layer S1, the information signal layer L1, the intermediate layer S2, the information signal layer L2, . . . , the intermediate layer Sn, and the information signal layer Ln are stacked in that order on the intermediate layer S1. The information signal layer Ln is spin-coated with a photosensitive resin, e.g., an ultraviolet-curable resin (UV resin), by the spin coating method, for example. The photosensitive resin is irradiated with light, e.g., ultraviolet rays, so as to be cured. Consequently, the light-transmitting layer 2 is formed on the information signal layer Ln.

The predetermined optical information recording medium 20 is obtained by the above-described processes.

Advantages

According to the second embodiment, the information signal layers L0 to Ln of the multilayer optical information recording medium 20 are formed from the inorganic recording layer 21 having a reduced Pd content or the inorganic recording layer (Pd-less recording layer) 21 not containing expensive Pd and, therefore, the price of the optical information recording medium 20 is reduced.

In the case where the film configuration of each of the information signal layers L0 to Ln is specified to be the film configuration of a single layer or three layers or less, the layer configuration of the multilayer optical information recording medium 20 is simplified. Consequently, the multilayer optical information recording medium 20 is allowed to become inexpensive and the productivity thereof is improved. In particular, in the case where all the information signal layers L0 to Ln are specified to have a single-layer structure made from the inorganic recording layer 21, the above-described effects of reducing the price and improving the productivity are remarkable.

In the case where at least one type selected from the group consisting of Cu, Mn, and Ni is used as the metal Y, usage of the noble metals, e.g., Pd and Ag, may be reduced or no noble metal may be contained. Therefore, the price of the multilayer optical information recording medium 20 is further reduced.

EXAMPLES

The present disclosure will be described below concretely with reference to examples. However, the present disclosure is not limited to these examples.

In the following explanations, information signal layers of a multilayer optical information recording medium are referred to as L0 layer (first layer), L1 layer (second layer), L2 layer (third layer), . . . , from a substrate side toward a laser light-irradiation surface side.

The examples according to the present disclosure will be described in the following order.

1. Comparison of characteristics between Pd-containing recording layer and Pd-less recording layer 2. Composition of Pd-less recording layer 1. Comparison of characteristics between Pd-containing recording layer and Pd-less recording layer Example 1-1

A polycarbonate substrate having a thickness of 1.1 mm was formed through injection forming. An uneven surface having an in-groove and an on-groove was formed on the resulting polycarbonate substrate. A first protective layer, an inorganic recording layer, and a second protective layer were stacked in that order on the uneven surface of the polycarbonate substrate by a sputtering method. A concrete configuration of each layer and the film formation condition were as described below.

First Protective Layer (Substrate Side)
Material: mixture of $SiO_2$, $In_2O_3$, and $ZrO_2$ (hereafter referred to as SIZ)
Thickness: 10 nm
Film formation condition: Film was formed by RF-sputtering the SIZ target.
Inorganic Recording Layer
Material: W—Cu—Zn—O
Thickness: 40 nm
Film formation condition: Film was formed by co-sputtering W target, Cu target, and Zn target in a mixed gas atmosphere of an Ar gas and an $O_2$ gas. In this regard, the input power of each of the W, Cu, and Zn targets was adjusted in such a way that the atomic ratios a, b, and c of W, Cu, and Zn, respectively, in the inorganic recording layer satisfied a:b:c=19.0 atomic percent:62.1 atomic percent:18.9 atomic percent, as shown in Table 1.

Here, the composition of the inorganic recording layer was adjusted in such a way that the transmittance of L1 layer (second layer) of a four-layer optical information recording medium was obtained. Hereafter the inorganic recording layer having a composition adjusted as described above is referred to as an "L1-equivalent" inorganic recording layer.

Second protective layer (light-transmitting layer side)
Material: SIZ
Thickness: 24 nm
Film formation condition: Film was formed by RF-puttering the SIZ target.

An ultraviolet-curable resin (trade name: SK8300, produced by Sony Chemical & Information Device Corporation) was applied uniformly to the second protective layer by a spin coating method, and ultraviolet rays were applied to the resin to effect curing, so that a light-transmitting layer having a thickness of 100 µm was formed.

In this manner, the predetermined optical information recording medium was obtained.

Example 1-2

An optical information recording medium was obtained in the same manner as in Example 1-1 except that the input power of each of the W, Cu, and Zn targets was adjusted in such a way that the atomic ratios a, b, and c of W, Cu, and Zn, respectively, in the inorganic recording layer satisfied a:b:c=26.5 atomic percent:47.3 atomic percent:26.2 atomic percent, as shown in Table 1. Here, the composition of the inorganic recording layer was adjusted in such a way that the transmittance of L3 layer (fourth layer) of a four-layer optical information recording medium was obtained. Hereafter the inorganic recording layer having a composition adjusted as described above is referred to as an "L3-equivalent" inorganic recording layer.

Comparative Example 1-1

A polycarbonate substrate having a thickness of 1.1 mm was formed through injection forming. An uneven surface having an in-groove and an on-groove was formed on the resulting polycarbonate substrate. A first protective layer, an inorganic recording layer, and a second protective layer were stacked in that order on the uneven surface of the polycarbonate substrate by the sputtering method. A concrete configuration of each layer and the film formation condition were as described below.

First Protective Layer (Substrate Side)
Material: SIZ
Thickness: 10 nm
Film formation condition: Film was formed by RF-sputtering the SIZ target.

Inorganic recording layer
Material: W—Cu—Zn—Pd—O
Thickness: 40 nm
Film formation condition: Film was formed by co-sputtering W target, Cu target, Zn target, and Pd target in a mixed gas atmosphere of an Ar gas and an $O_2$ gas.

In this regard, the input power of each of the W, Cu, Zn, and Pd targets was adjusted in such a way that the atomic ratios a, b, c, and d of W, Cu, Zn, and Pd, respectively, in the inorganic recording layer satisfied a:b:c:d=31.3 atomic percent:40.7 atomic percent:12.4 atomic percent:15.6 atomic percent, as shown in Table 1. Here, the composition of the inorganic recording layer was adjusted in such a way that the transmittance of L1 layer (second layer) of a four-layer optical information recording medium was obtained. That is, the inorganic recording layer was specified to be an L1-equivalent inorganic recording layer.

Second Protective Layer (Light-Transmitting Layer Side)
Material: SIZ
Thickness: 24 nm
Film formation condition: Film was formed by RF-puttering the SIZ target.

An ultraviolet-curable resin (trade name: SK8300, produced by Sony Chemical & Information Device Corporation) was applied uniformly to the second protective layer by the spin coating method, and ultraviolet rays were applied to the resin to effect curing, so that a light-transmitting layer having a thickness of 100 µm was formed.

In this manner, the predetermined optical information recording medium was obtained.

Comparative Example 1-2

An optical information recording medium was obtained in the same manner as in Comparative example 1-1 except that the input power of each of the W, Cu, Zn, and Pd targets was adjusted in such a way that the atomic ratios a, b, c, and d of H, Cu, Zn and, Pd, respectively, in the inorganic recording layer satisfied a:b:c:d=35.4 atomic percent:17.1 atomic percent:35.1 atomic percent:12.4 atomic percent, as shown in Table 1. Here, the composition of the inorganic recording layer was adjusted in such a way that the transmittance of L3 layer (fourth layer) of a four-layer optical information recording medium was obtained. The inorganic recording layer was specified to be an L3-equivalent inorganic recording layer.

Evaluation of Transmittance

The transmittance of each of the optical information recording media of Examples 1-1 and 1-2 and Comparative examples 1-1 and 1-2 obtained as described above was measured by using a spectrophotometer (trade name: V-530, produced by JASCO Corporation), where the transmittance was measured with respect to recording wavelength of 405 nm. The results thereof are shown in Table 1.

Evaluation of Reflectivity

The reflectivity of each of the optical information recording media of Examples 1-1 and 1-2 and Comparative examples 1-1 and 1-2 obtained as described above was measured by using Disc Tester (trade name: ODU-1000, produced by PULSTEC INDUSTRIAL CO., LTD.) at NA=0.85 and a recording wavelength of 405 nm. The results thereof are shown in Table 1.

i-MLSE Characteristics (1)

Figure 5A:
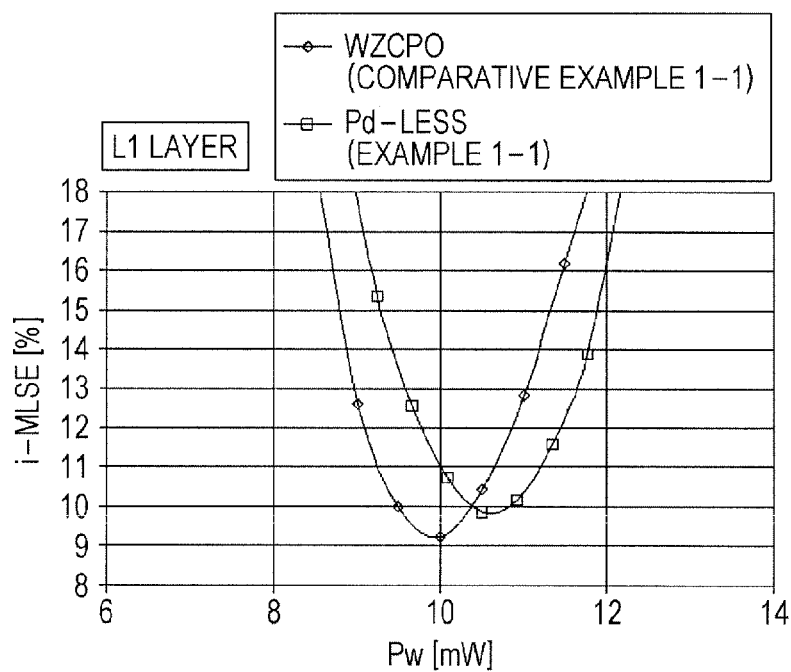
FIG. 5A is a graph showing the relationship between the recording power Pw and the i-MLSE of optical information recording media in Example 1-1 and Comparative example 1-1.
Figure 5B:
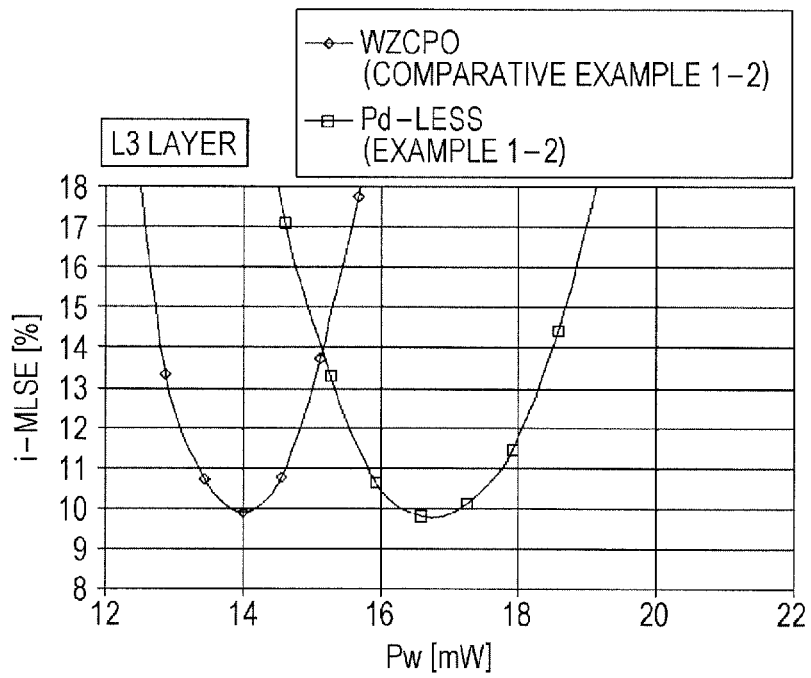
FIG. 5B is a graph showing the relationship between the recording power Pw and the i-MLSE of optical information recording media in Example 1-2 and Comparative example 1-2.

The i-MLSE characteristics of each of the optical information recording media of Examples 1-1 and 1-2 and Comparative examples 1-1 and 1-2 obtained as described above were determined as described below. Disc Tester (trade name: ODU-1000, produced by PULSTEC INDUSTRIAL CO., LTD.) was used and 1-7 modulated data with the density per layer of 32 GB were recorded and reproduced at NA=0.85, a recording wavelength of 405 nm, and a recording linear velocity of 7.69 m/s. The results of the i-MLSE value versus the recording power Pw are shown in FIG. 5A and FIG. 5B.

i-MLSE Characteristics (2)

Figure 6A:
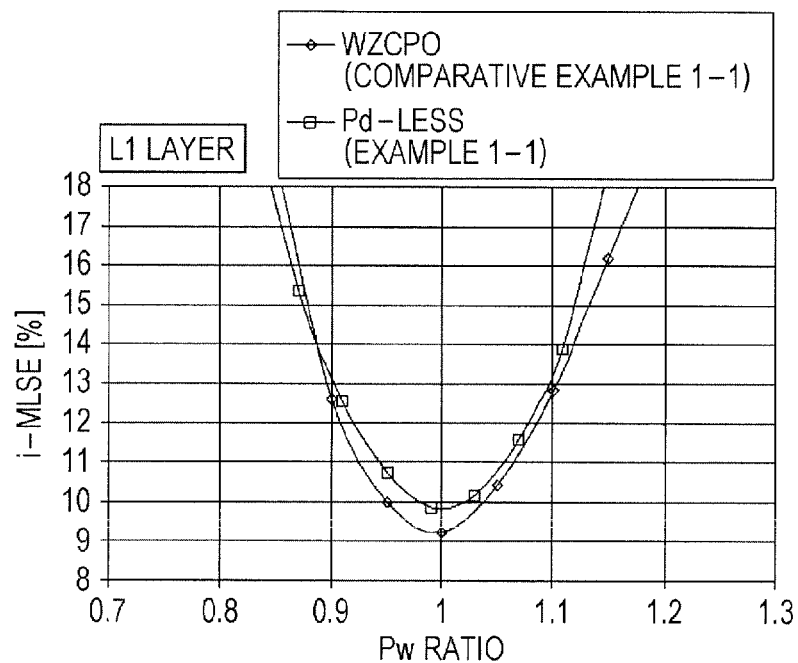
FIG. 6A is a graph showing the relationship between the Pw ratio and the i-MLSE of the optical information recording media in Example 1-1 and Comparative example 1-1.
Figure 6B:
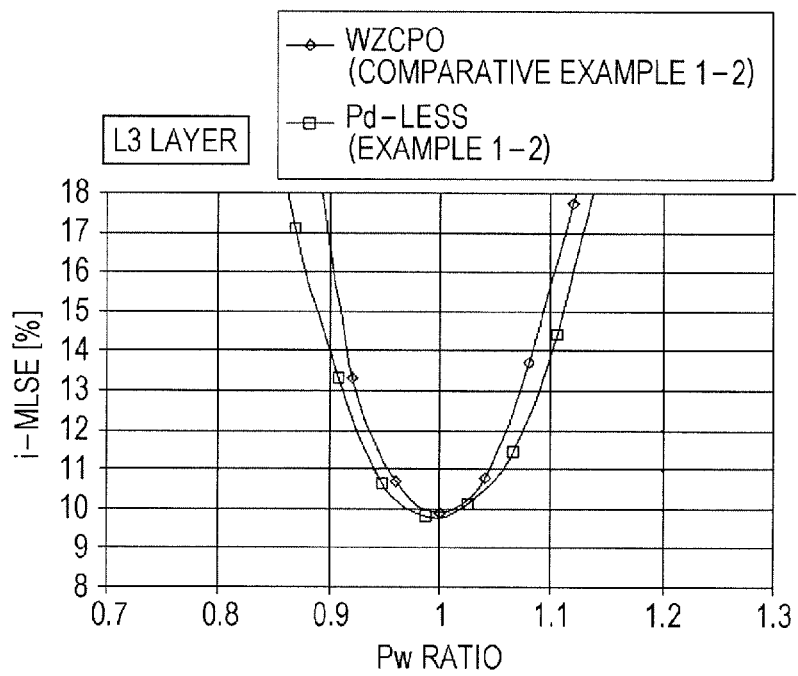
FIG. 6B is a graph showing the relationship between the Pw ratio and the i-MLSE of the optical information recording media in Example 1-2 and Comparative example 1-2.

In FIG. 6A and FIG. 6B, the vertical axis represents the i-MLSE value of each of the optical information recording media of Examples 1-1 and 1-2 and Comparative examples 1-1 and 1-2 obtained as described above and the horizontal axis represents the Pw Ratio which is determined by normalizing the recording power Pw with Pwo. In this regard, the i-MLSE was determined with respect to the recording power, the lower side of the recording power exceeding 14% was specified to be Pwl and the higher side was specified to be Pwh, and a median value of Pwl and Pwh was specified to be an optimum recording power Pwo.

SER Characteristics

Figure 7A:
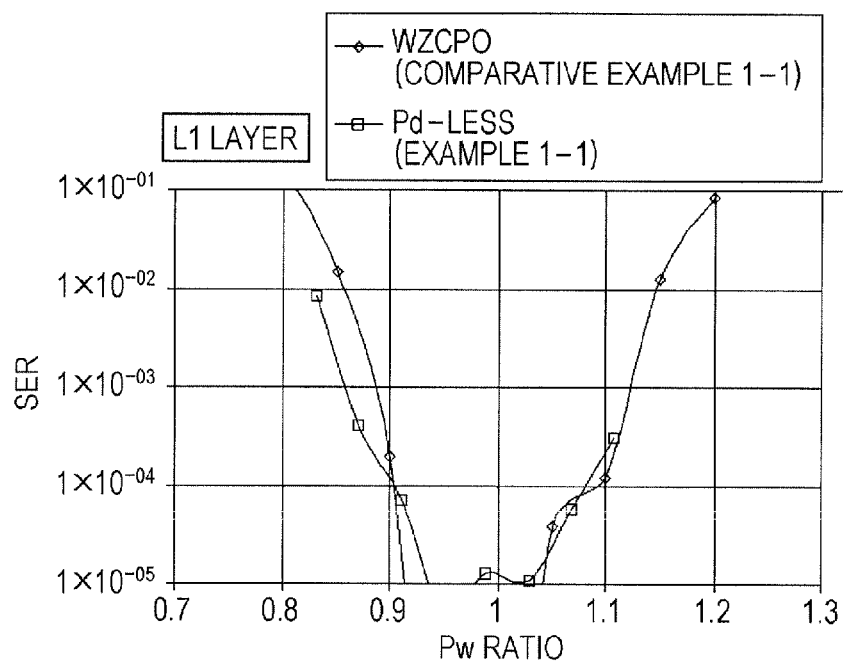
FIG. 7A is a graph showing the relationship between the Pw ratio and the SER of the optical information recording media in Example 1-1 and Comparative example 1-1.
Figure 7B:
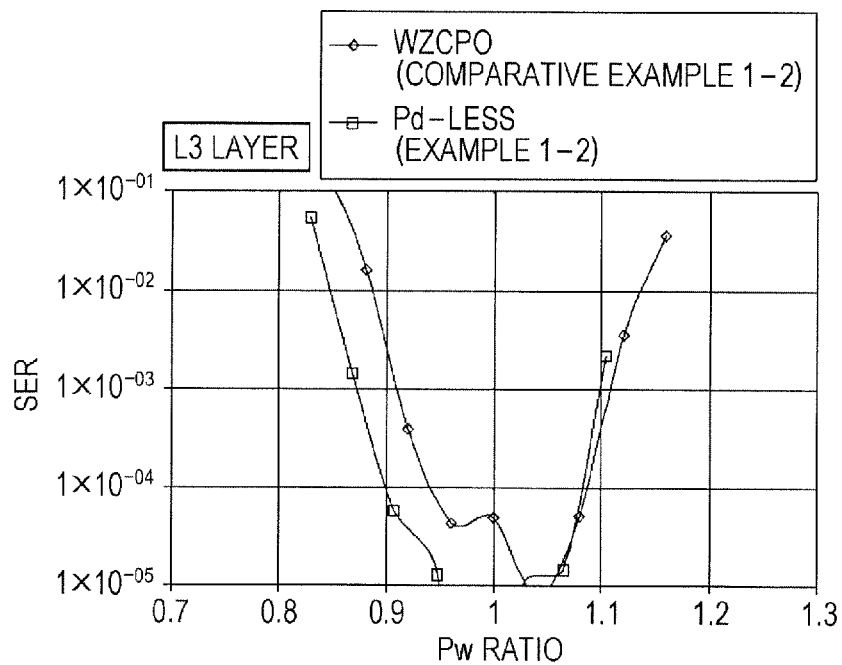
FIG. 7B is a graph showing the relationship between the Pw ratio and the SER of the optical information recording media in Example 1-2 and Comparative example 1-2.

The random symbol error rate (SER) of each of the optical information recording media of Examples 1-1 and 1-2 and Comparative examples 1-1 and 1-2 obtained as described above was determined as described below. Disc Tester (trade name: ODU-1000, produced by PULSTEC INDUSTRIAL CO., LTD.) was used and 1-7 modulated data with the density per layer of 32 GB were recorded and reproduced at a recording wavelength of 405 nm and a recording linear velocity of 7.69 m/s, so as to determine the SER. The results of the SER value versus the Pw ratio are shown in FIG. 7A and FIG. 7B.

Degree of Modulation

Figure 8A:
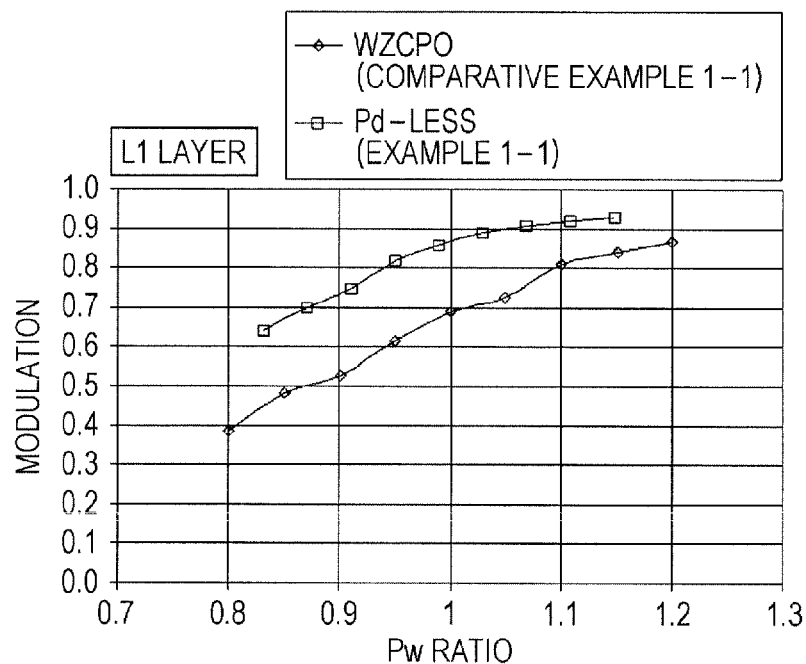
FIG. 8A is a graph showing the relationship between the Pw ratio and the degree of modulation of the optical information recording media in Example 1-1 and Comparative example 1-1.
Figure 8B:
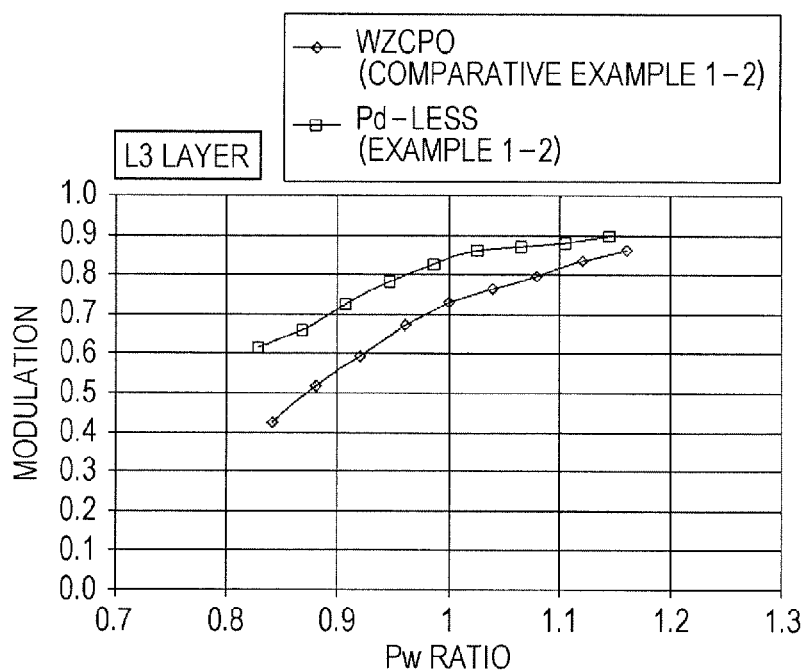
FIG. 8B is a graph showing the relationship between the Pw ratio and the degree of modulation of the optical information recording media in Example 1-2 and Comparative example 1-2.

The degree of modulation of each of the optical information recording media of Examples 1-1 and 1-2 and Comparative examples 1-1 and 1-2 obtained as described above was determined as described below. Disc Tester (trade name: ODU-1000, produced by PULSTEC INDUSTRIAL CO., LTD.) was used and 1-7 modulated data with the density per layer of 32 GB were recorded and reproduced at a recording wavelength of 405 nm and a recording linear velocity of 7.69 m/s, so as to determine the degree of modulation (signal amplitude ratio). The results of the degree of modulation versus the Pw ratio are shown in FIG. 8A and FIG. 8B.

Table 1 shows the configurations and the evaluation results of the optical information recording media of Examples 1-1 and 1-2 and Comparative examples 1-1 and 1-2.

TABLE 1

|  | Atomic ratio a of W [atomic percent] | Atomic ratio b of Cu [atomic percent] | Atomic ratio c of Zn [atomic percent] | Atomic ratio d of Pd [atomic percent] | Transmittance [%] | Reflectivity [%] | Remarks |
|---|---|---|---|---|---|---|---|
| Example 1-1 | 19.0 | 62.1 | 18.9 | 0.0 | 66.7 | 3.0 | L1-equivalent |
| Example 1-2 | 26.5 | 47.3 | 26.2 | 0.0 | 73.5 | 3.1 | L3-equivalent |
| Comparative example 1-1 | 31.3 | 40.7 | 12.4 | 15.6 | 64.2 | 6.5 | L1-equivalent |
| Comparative example 1-2 | 35.4 | 17.1 | 35.1 | 12.4 | 71.0 | 3.0 | L3-equivalent |

The following are clear from Table 1 and FIG. 3A to FIG. 8B.

In Examples 1-1 and 1-2 in which the Pd-less recording layer was used, the i-MLSE characteristics, the SER characteristics, and the degree of modulation at levels equivalent to those in Comparative examples 1-1 and 1-2 were obtained. Therefore, even when Pd is not contained, the characteristics nearly equivalent to those in the case where W—Cu—Zn—Pd—O was used as the recording material were maintained by using W—Cu—Zn—O as the recording material.

Example 1-2 (L3-equivalent inorganic recording layer) in which the transmittance of the recording layer was specified to be in the seventies on a percent basis, the characteristics nearly equivalent to those in Example 1-1 (L1-equivalent inorganic recording layer) in which the transmittance of the recording layer was specified to be in the sixties on a percent basis. Therefore, the inorganic recording layer containing W—Cu—Zn—O as a primary component can maintain good characteristics even when the transmittance is changed by adjusting the composition. Consequently, it is believed that the inorganic recording layer containing W—Cu—Zn—O as a primary component is suitable for use in the multilayer optical information recording medium.

2. Composition of Pd-Less Recording Layer

Examples 2-1 to 2-5

An inorganic recording layer was formed by employing W—Cu—O in place of W—Cu—Zn—O. An optical information recording medium was obtained in the same manner as in Example 1-1 except that the input power of each of the W and Cu targets was adjusted in such a way that the atomic ratios a and b of W and Cu, respectively, in the inorganic recording layer became within the range of a:b=4 to 50 atomic percent:50 to 96 atomic percent, as shown in Table 2.

Examples 3-1 to 3-4

An inorganic recording layer was formed by employing Mo—Cu—O in which Mo was used as the metal X in place of W. The input power of each of the Mo and Cu targets was adjusted in such a way that the atomic ratios a and b of Mo and Cu, respectively, in the inorganic recording layer became within the range of a:b=4 to 31 atomic percent:69 to 96 atomic percent, as shown in Table 2. An optical information recording medium was obtained in the same manner as in Example 2-1 except those described above.

Examples 4-1 to 4-4

An inorganic recording layer was formed by employing W—Mn—O in which Mn was used as the metal Y in place of Cu. The input power of each of the W and Mn targets was adjusted in such a way that the atomic ratios a and b of W and Mn, respectively, in the inorganic recording layer became within the range of a:b=6 to 55 atomic percent:45 to 94 atomic percent, as shown in Table 2. An optical information recording medium was obtained in the same manner as in Example 2-1 except those described above.

Examples 5-1 to 5-4

An inorganic recording layer was formed by employing W—Ni—O in which Ni was used as the metal Y in place of Cu. The input power of each of the W and Ni targets was adjusted in such a way that the atomic ratios a and b of W and Ni, respectively, in the inorganic recording layer became within the range of a:b=5 to 36 atomic percent:64 to 95 atomic percent, as shown in Table 2. An optical information recording medium was obtained in the same manner as in Example 2-1 except those described above.

Examples 6-1 to 6-4

An inorganic recording layer was formed by employing W—Ag—O in which Ag was used as the metal Y in place of Cu. The input power of each of the W and Ag targets was adjusted in such a way that the atomic ratios a and b of W and Ag, respectively, in the inorganic recording layer became within the range of a:b=6 to 40 atomic percent:60 to 94 atomic percent, as shown in Table 2. An optical information recording medium was obtained in the same manner as in Example 2-1 except those described above.

Examples 7-1 and 7-2

An inorganic recording layer was formed by employing W—Cu—Zn—O in which Zn oxide was further contained as the metal oxide. The input power of each of the W, Cu, and Zn targets was adjusted in such a way that the atomic ratios a, b, and c of W, Cu, and Zn, respectively, in the inorganic recording layer became within the range of a:b=23 to 36 atomic percent:64 to 77 atomic percent and (a+b):c=73.8 to 81.1 atomic percent:18.9 to 26.2 atomic percent, as shown in Table 2. An optical information recording medium was obtained in the same manner as in Example 2-1 except those described above.

Comparative Example 2

An inorganic recording layer was formed by employing Si—Cu—O in which Si was used as the metal X in place of W. The input power of each of the Si and Cu targets was adjusted in such a way that the atomic ratios a and b of Si and Cu, respectively, in the inorganic recording layer satisfied a:b=10 atomic percent:90 atomic percent, as shown in Table 2. An optical information recording medium was obtained in the same manner as in Example 2-1 except those described above.

Comparative Example 3

An inorganic recording layer was formed by employing Te—Cu—O in which Te was used as the metal X in place of W. The input power of each of the Te and Cu targets was adjusted in such a way that the atomic ratios a and b of Te and Cu, respectively, in the inorganic recording layer satisfied a:b=15 atomic percent:85 atomic percent, as shown in Table 2. An optical information recording medium was obtained in the same manner as in Example 2-1 except those described above.

Comparative Example 4

An inorganic recording layer was formed by employing W—Sb—O in which Sb was used as the metal Y in place of Cu. The input power of each of the W and Sb targets was adjusted in such a way that the atomic ratios a and b of W and Sb, respectively, in the inorganic recording layer satisfied a:b=20 atomic percent:80 atomic percent, as shown in Table 2. An optical information recording medium was obtained in the same manner as in Example 2-1 except those described above.

Comparative Example 5

An inorganic recording layer was formed by employing W—Ge—O in which Ge was used as the metal Y in place of Cu. The input power of each of the W and Ge targets was adjusted in such a way that the atomic ratios a and b of W and Ge, respectively, in the inorganic recording layer satisfied a:b=20 atomic percent:80 atomic percent, as shown in Table 2. An optical information recording medium was obtained in the same manner as in Example 2-1 except those described above.

Comparative Example 6

An inorganic recording layer was formed by employing Mo—Sn—O in which Mo was used as the metal X in place of W and Sn was used as the metal Y in place of Cu. The input power of each of the Mo and Sn targets was adjusted in such a way that the atomic ratios a and b of Mo and Sn, respectively, in the inorganic recording layer satisfied a:b=15 atomic percent:85 atomic percent, as shown in Table 2. An optical information recording medium was obtained in the same manner as in Example 2-1 except those described above.

Comparative Example 7

An inorganic recording layer was formed by employing W—Nb—O in which Nb was used as the metal Y in place of Cu. The input power of each of the W and Nb targets was adjusted in such a way that the atomic ratios a and b of W and Nb, respectively, in the inorganic recording layer satisfied a:b=15 atomic percent:85 atomic percent, as shown in Table 2. An optical information recording medium was obtained in the same manner as in Example 2-1 except those described above.

Optimum Recording Power Pwo

The optimum recording power Pwo in an initial state of each of the optical information recording media of Examples 2-1 to 7-2 and Comparative examples 2 to 7 obtained as described above was determined as described below. Disc Tester (trade name: ODU-1000, produced by PULSTEC INDUSTRIAL CO., LTD.) was used and 1-7 modulated data with the density per layer of 32 GB were recorded and reproduced at a recording wavelength of 405 nm and a recording linear velocity of 7.69 m/s, so as to determine the i-MLSE. In this regard, the i-MLSE was determined with respect to the recording power, the lower side of the recording power exceeding 14% was specified to be Pwl and the higher side was specified to be Pwh, and a median value of Pwl and Pwh was specified to be an optimum recording power Pwo. The results thereof are shown in Table 2, FIG. 9A, and FIG. 9B. Here, the i-MLSE of 14% is an upper limit value of the i-MLSE where error correction does not fail, and it is said that if the upper limit value is exceeded, defects occur in reproduced data and the signal quality is significantly bad. The recording power does not refer to a recording power of a semiconductor laser but refer to a recording power of laser light incident on a light-irradiation surface of an optical information recording medium.

Figure 9A:
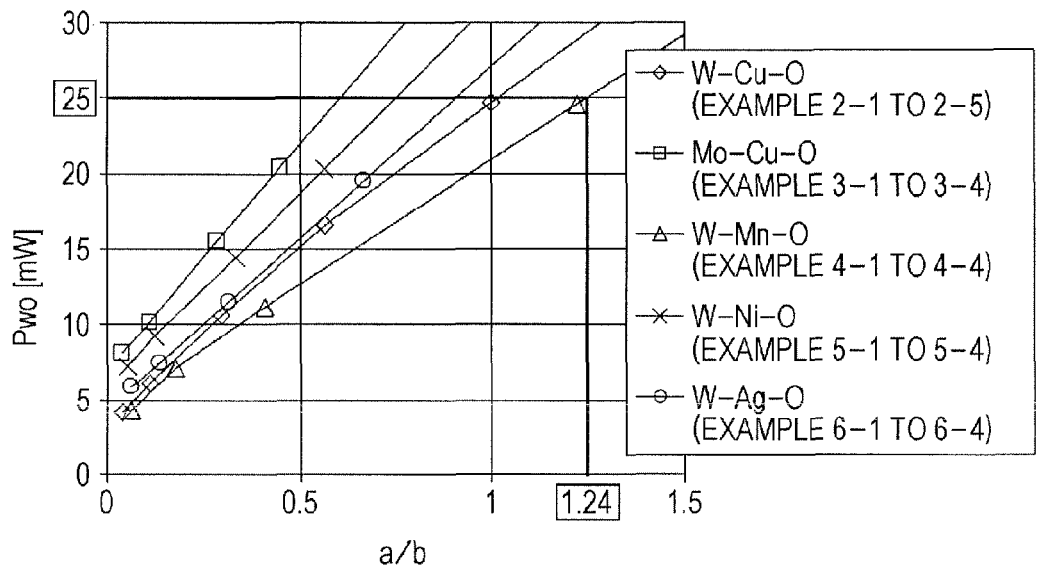
FIG. 9A and FIG. 9B are graphs showing the relationship between the ratio (a/b) and the optimum recording power Pwo of the optical information recording media in Examples 2-1 to 6-4.
Figure 9B:
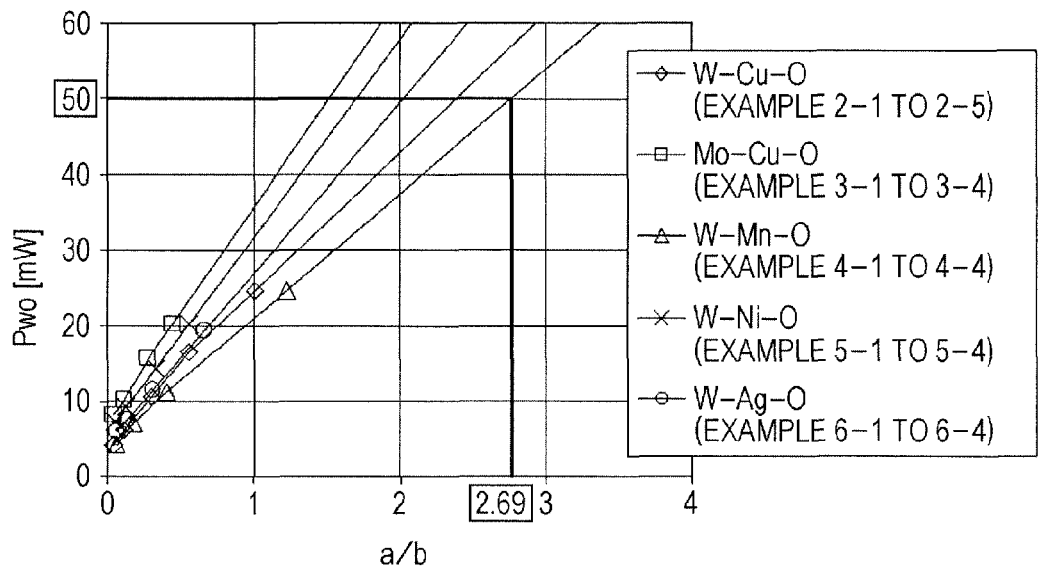

In this regard, the approximate straight lines shown in FIG. 9A and FIG. 9B were determined on the basis of linear approximation by a least square method.

Power Margin PM'

The power margin PM' with respect to the SER of each of the optical information recording media of Examples 2-1 to 7-2 and Comparative examples 2 to 7 obtained as described above was determined as described below. The SER was determined with respect to the recording power, the lower side of the recording power exceeding $4 \times 10^{-3}$ was specified to be Pwl' and the higher side was specified to be Pwh'. The resulting recording powers Pwl' and Pwh' and the optimum recording power Pwo were substituted into the following formula (1) to determine the power margin PM' with respect to the SER. The results thereof are shown in Table 2.

$$PM'=(Pwh'-Pwl')/Pwo \qquad (1)$$

i-MLSE

The i-MLSE of each of the optical information recording media of Examples 2-1 to 7-2 and Comparative examples 2 to 7 obtained as described above was determined as described below. Disc Tester (trade name: ODU-1000, produced by PULSTEC INDUSTRIAL CO., LTD.) was used and 1-7 modulated data with the density per layer of 32 GB were recorded and reproduced at NA=0.85, a recording wavelength of 405 nm, and a recording linear velocity of 7.69 m/s. The results thereof are shown in Table 2.

Evaluation of Characteristics

The characteristics of each of the optical information recording media of Examples 2-1 to 7-2 and Comparative examples 2 to 7 obtained as described above was evaluated as described below. The results thereof are shown in Table 2.

○: i-MLSE is 12% or less and power margin is 10% or more

Δ: i-MLSE is 12% or less and power margin is less than 10%

X: i-MLSE is less than 12% and power margin is less than 10%

In the case where the i-MLSE is 12% or less, the recording state is sufficiently good and even when there are variations in a reproduction system, good reproduction characteristics are obtained. In the case where the power margin is 10% or more, even when the laser power is fluctuated in recording, stable recording characteristics are maintained.

Table 2 shows the configurations and the evaluation results of the optical information recording media of Examples 2-1 to 7-2 and Comparative examples 2 to 7.

The following are clear from Table 2.

According to the evaluation results of Example 2-1 to Example 6-4 and Comparative examples 2 to 7, the i-MLSE is made to be 12% or less by using W or Mo as the metal X and using Cu, Mn, Ni, or Ag as the metal Y. It is estimated that the same effects as those described above are also obtained in the system in which W and No are used as the metal X in combination and in the system in which at least two types of Cu, Mn, Ni, and Ag are used as the metal Y in combination.

According to the evaluation results of Examples 7-1 and 7-2, in the case where the inorganic recording layer further contains an oxide of metal Z (Zn oxide) in addition to an oxide of the metal X and an oxide of the metal Y as well, the i-MLSE is made to be 12% or less.

According to the evaluation results of Examples 2-1 to 2-5 and 4-1 to 6-4, the power margin is improved by using Cu as the metal Y as compared with that in the case where Mn, Ni, or Ag is used as the metal Y. It is estimated that the power margin is also improved in the case where Cu is used in combination with other metal Y (Mn, Ni, Ag) as compared with that in the case where Mn, Ni, or Ag is used alone as the metal Y.

The following are clear from Table 2, FIG. 9A, and FIG. 9B.

According to the evaluation results of Example 2-1 to Example 6-4 shown in Table 2, the i-MLSE is made to be 12% or less and the power margin is made to be 10% or more by specifying the ratio (a/b) to be 0.1 or more. It is estimated that

TABLE 2

| | Material for recording layer | Metal X | Metal Y | a [atomic percent] | b [atomic percent] | a/b | Pwo [mW] | i-MLSE [%] | Power margin [%] | Evaluation | Remarks |
|---|---|---|---|---|---|---|---|---|---|---|---|
| Example 2-1 | W-Cu-O | W | Cu | 4 | 96 | 0.04 | 4.2 | 10.9 | 8 | Δ | |
| Example 2-2 | W-Cu-O | W | Cu | 10 | 90 | 0.11 | 6.1 | 10.3 | 15 | ○ | |
| Example 2-3 | W-Cu-O | W | Cu | 23 | 77 | 0.30 | 10.6 | 9.8 | 28 | ○ | |
| Example 2-4 | W-Cu-O | W | Cu | 36 | 64 | 0.56 | 16.6 | 9.8 | 23 | ○ | |
| Example 2-5 | W-Cu-O | W | Cu | 50 | 50 | 1.00 | 24.7 | 10.6 | 19 | ○ | |
| Example 3-1 | Mo-Cu-O | Mo | Cu | 4 | 96 | 0.04 | 8.1 | 11 | 9 | Δ | |
| Example 3-2 | Mo-Cu-O | Mo | Cu | 10 | 90 | 0.11 | 10.2 | 10.4 | 18 | ○ | |
| Example 3-3 | Mo-Cu-O | Mo | Cu | 22 | 78 | 0.28 | 15.6 | 9.9 | 25 | ○ | |
| Example 3-4 | Mo-Co-O | Mo | Cu | 31 | 69 | 0.45 | 20.4 | 10.2 | 24 | ○ | |
| Example 4-1 | W-Mn-O | W | Mn | 6 | 94 | 0.06 | 4.3 | 10.2 | 6 | Δ | |
| Example 4-2 | W-Mn-O | W | Mn | 15 | 85 | 0.18 | 7.1 | 8.9 | 12 | ○ | |
| Example 4-3 | W-Mn-O | W | Mn | 29 | 71 | 0.41 | 11.2 | 9.0 | 17 | ○ | |
| Example 4-4 | W-Mn-O | W | Mn | 55 | 45 | 1.22 | 24.6 | 9.9 | 20 | ○ | |
| Example 5-1 | W-Ni-O | W | Ni | 5 | 95 | 0.05 | 7.2 | 10.7 | 5 | Δ | |
| Example 5-2 | W-Ni-O | W | Ni | 11 | 89 | 0.12 | 9.2 | 10 | 13 | ○ | |
| Example 5-3 | W-Ni-O | W | Ni | 25 | 75 | 0.33 | 14.4 | 9.7 | 19 | ○ | |
| Example 5-4 | W-Ni-O | W | Ni | 36 | 64 | 0.56 | 20.3 | 9.9 | 18 | ○ | |
| Example 6-1 | W-Ag-O | W | Ag | 6 | 94 | 0.06 | 5.9 | 10.1 | 5 | Δ | |
| Example 6-2 | W-Ag-O | W | Ag | 12 | 88 | 0.14 | 7.5 | 9.5 | 12 | ○ | |
| Example 6-3 | W-Ag-O | W | Ag | 24 | 76 | 0.32 | 11.5 | 9.1 | 15 | ○ | |
| Example 6-4 | W-Ag-O | W | Ag | 40 | 60 | 0.67 | 19.5 | 8.9 | 17 | ○ | |
| Example 7-1 | W-Cu-Zn-O | W | Cu | 23 | 77 | 0.30 | 10.8 | 9.6 | 29 | ○ | Zn:18.9 atomic percent |
| Example 7-2 | W-Cu-Zn-O | W | Cu | 36 | 64 | 0.56 | 16.2 | 9.3 | 25 | ○ | Zn:26.2 atomic percent |
| Comparative example 2 | Si-Cu-O | Si | Cu | 10 | 90 | 0.11 | 23 | 14.3 | 8 | X | |
| Comparative example 3 | Te-Cu-O | Te | Cu | 15 | 85 | 0.18 | 21 | 16.4 | 4 | X | |
| Comparative example 4 | W-Sb-O | W | Sb | 20 | 80 | 0.25 | >25 | 22 | — | — | |
| Comparative example 5 | W-Ge-O | W | Ge | 20 | 80 | 0.25 | >25 | 22 | — | — | |
| Comparative example 6 | Mo-Sn-O | Mo | Sn | 15 | 85 | 0.18 | >25 | 22 | — | — | |
| Comparative example 7 | W-Nb-O | W | Nb | 15 | 85 | 0.18 | >25 | 22 | — | — | | a: atomic ratio of metal X relative to a total of meta X and metal Y
b: atomic ratio of metal Y relative to a otal of meta X and metal Y
a/b: atomic ratio a of metal X to atomic ratio b of metal Y the same effects as those described above are also obtained in the case where the inorganic recording layer further contains an oxide of metal Z (oxide of Zn) by specifying the ratio (a/b) to be 0.1 or more.

According to the evaluation results of Example 2-1 to Example 6-4 shown in Table 2, the power margin is further improved by specifying the ratio (a/b) to be 0.25 or more.

According to FIG. 9A and FIG. 9B, the optimum recording power Pwo tends to increase as the ratio (a/b) increases.

According to FIG. 9A, the optimum recording power Pwo is made to be about 25 mW or less in every combination of the metal X (=Cu, Mn) and the metal Y (=Cu, Mn, Ni, Ag) by specifying the ratio (a/b) to be 1.3 or less. In this regard, the optimum recording power Pwo of 25 mW is believed to be a maximum value of the recording power of laser light which can be emitted from a semiconductor laser mounted on a current consumer-oriented drive.

According to FIG. 9B, the optimum recording power Pwo is made to be about 50 mW or less in every combination of the metal X (=Cu, Mn) and the metal Y (=Cu, Mn, Ni, Ag) by specifying the ratio (a/b) to be 2.7 or less. In this regard, the optimum recording power Pwo of 50 mW is believed to be a maximum value of the recording power of laser light which can be emitted from a semiconductor laser mounted on a future consumer-oriented drive.

Considering all the above-described factors, the ratio (a/b) is preferably specified to be 0.1 or more and 2.7 or less and is more preferably specified to be 0.25 or more and 2.7 or less. Alternatively, the ratio (a/b) is preferably specified to be 0.1 or more and 1.3 or less and is more preferably specified to be 0.25 or more and 1.3 or less.

Up to this point, the embodiments according to the present disclosure have been concretely explained. However, the present disclosure is not limited to the above-described embodiments, and various modification on the basis of the technical idea of the present disclosure can be made.

For example, the configurations, the methods, the processes, the shapes, the materials, the numerical values, and the like mentioned in the above-described first and second embodiments are no more than examples, and as necessary, configurations, methods, processes, shapes, materials, numerical values, and the like different from them may be employed.

Furthermore, the configurations, the methods, the processes, the shapes, the materials, the numerical values, and the like mentioned in the above-described first and second embodiments can be combined with each other within the bounds of not departing from the gist of the present disclosure.

In the above-described first and second embodiments, the case where the present disclosure is applied to the optical information recording medium having a configuration in which at least one layer of information signal layer and a light-transmitting layer are stacked in that order on the substrate and being used for recording or reproducing information signals on the basis of application of laser light from the light-transmitting layer side to the at least one information signal layer is explained as an example. However, the present disclosure is not limited to this example. The present disclosure can also be applied to, for example, an optical information recording medium having a configuration in which at least one layer of information signal layer and a protective layer are stacked in that order on a substrate and being used for recording or reproducing information signals on the basis of application of laser light from the substrate side to the at least one information signal layer or an optical information recording medium having a configuration in which at least one layer of information signal layer is disposed between two substrates and being used for recording or reproducing information signals on the basis of application of laser light from one substrate side to the at least one information signal layer.

In the above-described second embodiment, the case where all inorganic recording layers included in the plurality of information signal layers have the same configuration (that is, a configuration containing an oxide of metal X and an oxide of metal Y as primary components) is explained as an example. However, the configuration of the multilayer optical information recording medium is not limited to this example. For example, a configuration in which at least one layer of the plurality of recording layers contains an oxide of metal X and an oxide of metal Y as primary components may be adopted.

The present disclosure may adopt the following configurations.

(1) An optical information recording medium including a recording layer capable of recording information signals on the basis of application of light, wherein the recording layer contains an oxide of metal X and an oxide of metal Y, the metal X is at least one type selected from the group consisting of tungsten and molybdenum, and the metal Y is at least one type selected from the group consisting of copper, manganese, nickel, and silver.

(2) An optical information recording medium including a recording layer capable of recording information signals on the basis of application of light, wherein the recording layer substantially consists of an oxide of metal X and an oxide of metal Y, the metal X is at least one type selected from the group consisting of tungsten and molybdenum, and the metal Y is at least one type selected from the group consisting of copper, manganese, nickel, and silver.

(3) An optical information recording medium including a plurality of recording layers capable of recording information signals on the basis of application of light, wherein at least one layer of the plurality of recording layers contains an oxide of metal X and an oxide of metal Y, the metal X is at least one type selected from the group consisting of tungsten and molybdenum, and the metal Y is at least one type selected from the group consisting of copper, manganese, nickel, and silver.

(4) An optical information recording medium including a plurality of recording layers capable of recording information signals on the basis of application of light, wherein at least one layer of the plurality of recording layers substantially consists of an oxide of metal X and an oxide of metal Y, the metal X is at least one type selected from the group consisting of tungsten and molybdenum, and the metal Y is at least one type selected from the group consisting of copper, manganese, nickel, and silver.

(5) The optical information recording medium according to the item (3) or (4), wherein all the plurality of recording layers contain an oxide of the metal X and an oxide of the metal Y.

(6) The optical information recording medium according to any one of the items (1) to (5), wherein a ratio (a/b) satisfies the relationship represented by $0.1 \leq a/b \leq 2.7$, where the atomic ratio of the metal X relative to a total of the metal X and the metal Y is specified to be a, and the atomic ratio of the metal Y relative to the total of the metal X and the metal Y is specified to be b.

(7) The optical information recording medium according to any one of the items (1) to (5), wherein a ratio (a/b) is about 0.1 or more and about 2.7 or less, where the atomic ratio of the metal X relative to a total of the metal X and the metal Y is specified to be a, and the atomic ratio of the metal Y relative to the total of the metal X and the metal Y is specified to be b.

(8) The optical information recording medium according to any one of the items (1) to (7), wherein the recording layer further contains an oxide of zinc.
(9) The optical information recording medium according to any one of the items (1) to (8), wherein the metal Y is at least one type selected from the group consisting of copper, manganese, and nickel.
(10) The optical information recording medium according to any one of the items (1) to (8), wherein the metal Y is copper.
(11) The optical information recording medium according to any one of the items (1) to (10), further including a protective layer disposed on at least one surface of the recording layer.
(12) The optical information recording medium according to the item (11), wherein the protective layer is a dielectric layer or a transparent electrically conductive layer.
(13) A recording layer for an optical information recording medium, containing an oxide of metal X and an oxide of metal Y, wherein the metal X includes at least one type selected from the group consisting of tungsten and molybdenum, and the metal Y includes at least one type selected from the group consisting of copper, manganese, nickel, and silver.
(14) A recording layer for an optical information recording medium, substantially consisting of an oxide of metal X and an oxide of metal Y, wherein the metal X includes at least one type selected from the group consisting of tungsten and molybdenum, and the metal Y includes at least one type selected from the group consisting of copper, manganese, nickel, and silver.
(15) A target for an optical information recording medium, containing an oxide of metal X and an oxide of metal Y, wherein the metal X includes at least one type selected from the group consisting of tungsten and molybdenum, and the metal Y includes at least one type selected from the group consisting of copper, manganese, nickel, and silver.
(16) A target for an optical information recording medium, substantially consisting of an oxide of metal X and an oxide of metal Y, wherein the metal X includes at least one type selected from the group consisting of tungsten and molybdenum, and the metal Y includes at least one type selected from the group consisting of copper, manganese, nickel, and silver.

The present disclosure contains subject matter related to that disclosed in Japanese Priority Patent Application JP 2011-228278 filed in the Japan Patent Office on Oct. 17, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical information recording medium comprising:
a recording layer configured to record information signals on the basis of application of light, wherein
the recording layer contains an oxide of metal X and an oxide of metal Y,
the metal X is at least one type selected from the group consisting of tungsten and molybdenum, and
the metal Y is at least one type selected from the group consisting of copper, manganese, nickel, and silver
wherein a ratio (a/b) satisfies the relationship represented by $0.1 \leq a/b \leq 2.7$,
where a is an atomic ratio of the metal X relative to a total of the metal X and the metal Y, and
b is an atomic ratio of the metal Y relative to the total of the metal X and the metal Y.

2. The optical information recording medium according to claim 1, wherein the recording layer further contains an oxide of zinc.

3. The optical information recording medium according to claim 1, wherein the metal Y is at least one type selected from the group consisting of copper, manganese, and nickel.

4. The optical information recording medium according to claim 1, wherein the metal Y is copper.

5. The optical information recording medium according to claim 1, further comprising a protective layer disposed on at least one surface of the recording layer.

6. The optical information recording medium according to claim 5, wherein the protective layer is a dielectric layer or a transparent electrically conductive layer.

7. An optical information recording medium comprising:
a plurality of recording layers configured to record information signals on the basis of application of light, wherein
at least one layer of the plurality of recording layers contains an oxide of metal X and an oxide of metal Y,
the metal X is at least one type selected from the group consisting of tungsten and molybdenum, and
the metal Y is at least one type selected from the group consisting of copper, manganese, nickel, and silver,
wherein a ratio (a/b) satisfies the relationship represented by $0.1 \leq a/b \leq 2.7$,
where a is an atomic ratio of the metal X relative to a total of the metal X and the metal Y, and
b is an atomic ratio of the metal Y relative to the total of the metal X and the metal Y.

8. The optical information recording medium according to claim 7, wherein all the plurality of recording layers contain an oxide of the metal X and an oxide of the metal Y.

9. A recording layer for an optical information recording medium, comprising:
an oxide of metal X and an oxide of metal Y,
wherein the metal X includes at least one type selected from the group consisting of tungsten and molybdenum, and
the metal Y includes at least one type selected from the group consisting of copper, manganese, nickel, and silver,
wherein a ratio (a/b) satisfies the relationship represented by $0.1 \leq a/b \leq 2.7$,
where a is an atomic ratio of the metal X relative to a total of the metal X and the metal Y, and
b is an atomic ratio of the metal Y relative to the total of the metal X and the metal Y.

10. The optical information recording medium of claim 1, wherein the ratio (a/b) satisfies the relationship represented by $0.25 \leq a/b \leq 1.3$.

11. The optical information recording medium of claim 7, wherein the ratio (a/b) satisfies the relationship represented by $0.25 \leq a/b \leq 1.3$.

12. The optical information recording medium according to claim 7, wherein the recording layer further contains a third oxide of zinc.

13. The optical information recording medium according to claim 7, wherein the metal Y is at least one type selected from the group consisting of copper, manganese, and nickel.

14. The optical information recording medium according to claim 7, wherein the metal Y is copper.

15. The recording layer of claim 9, wherein the ratio (a/b) satisfies the relationship represented by $0.25 \leq a/b \leq 1.3$.

16. The recording layer according to claim 9, wherein the recording layer further contains a third oxide of zinc.

17. The recording layer according to claim 9, wherein the metal Y is at least one type selected from the group consisting of copper, manganese, and nickel.

18. The recording layer according to claim 9, wherein the metal Y is copper.

* * * * *